United States Patent
Geyzel et al.

(10) Patent No.: US 9,639,910 B2
(45) Date of Patent: May 2, 2017

(54) SYSTEM FOR EMBEDDING DATA

(71) Applicant: NDS LIMITED, Staines, Middlesex (GB)

(72) Inventors: Zeev Geyzel, Alon Shvut (IL); Leonid Dorrendorf, Maale Adumim (IL)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 14/605,123

(22) Filed: Jan. 26, 2015

(65) Prior Publication Data
US 2015/0131847 A1 May 14, 2015

Related U.S. Application Data

(62) Division of application No. 12/514,674, filed as application No. PCT/IB2007/054477 on Nov. 5, 2007, now abandoned.

(30) Foreign Application Priority Data

Mar. 26, 2007 (IL) .......................... 182201

(51) Int. Cl.
*G06K 9/00* (2006.01)
*G06T 1/00* (2006.01)
*G06T 7/40* (2017.01)

(52) U.S. Cl.
CPC .......... *G06T 1/0021* (2013.01); *G06T 1/0028* (2013.01); *G06T 1/0085* (2013.01); *G06T 7/408* (2013.01)

(58) Field of Classification Search
None
See application file for complete search history.

(56) References Cited

U.S. PATENT DOCUMENTS

| | | | |
|---|---|---|---|
| 6,122,392 A * | 9/2000 | Rhoads | G06Q 20/341 382/100 |
| 6,658,568 B1 * | 12/2003 | Ginter | G06F 21/00 348/E5.006 |
| 6,721,440 B2 | 4/2004 | Reed et al. | |
| 6,760,463 B2 | 7/2004 | Rhoads | |
| 6,950,532 B1 | 9/2005 | Schumann et al. | |
| 7,031,493 B2 * | 4/2006 | Fletcher | G06T 1/0028 382/100 |

(Continued)

FOREIGN PATENT DOCUMENTS

WO 02/07362 A1 1/2002

OTHER PUBLICATIONS

Barni, M., et al., "Digital Watermarking of Visual Data: State of the Art and New Trends", European Signal Processing Conference No. 10, Tampere, Finland, Sep. 4, 2000, 8 pages.

(Continued)

*Primary Examiner* — Randolph I Chu
(74) *Attorney, Agent, or Firm* — Samuel M. Katz

(57) ABSTRACT

A method and system including receiving marking information, determining, at least in part, based on the marking 0 information, a plurality of color element additives, adding the plurality of color element additives to at least one color element of a video frame, wherein the at least one color element includes a color element R, a color element G, and a color element B. Related methods and systems are also described.

18 Claims, 10 Drawing Sheets

(56) References Cited

U.S. PATENT DOCUMENTS

| | | | |
|---|---|---|---|
| 7,068,809 B2 | 6/2006 | Stach | |
| 2002/0027612 A1* | 3/2002 | Brill | G06T 1/0071 |
| | | | 348/473 |
| 2003/0231768 A1* | 12/2003 | Fletcher | G06T 1/005 |
| | | | 380/205 |
| 2006/0157574 A1* | 7/2006 | Farrar | G06F 21/608 |
| | | | 235/494 |

OTHER PUBLICATIONS

Barni, M., et al., "Multichannel Watermarking of Color Images", IEEE Transactions on Circuits and Systems for Video Technology, vol. 12, No. 3, Mar. 2002, pp. 142-156.

Kanai, S., et al., "Digital Watermarking for 3D Polygons using Multiresolution Wavelet Decomposition", Dept. of Systems Engg. Graduate School of Engg., Hokkaido University, Sapporo 060, Japan, pp. 112.

* cited by examiner

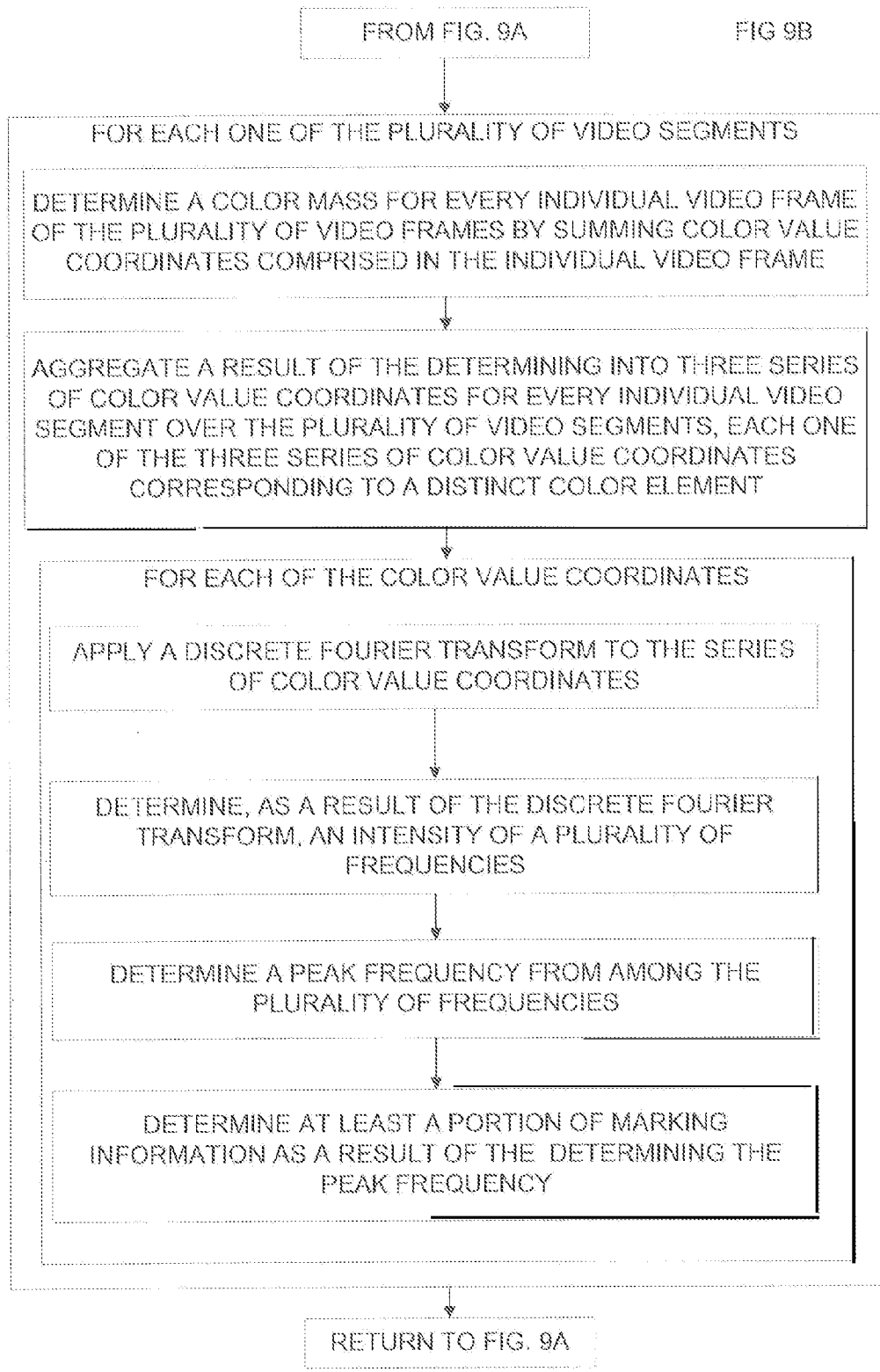

SYSTEM FOR EMBEDDING DATA

RELATED APPLICATION INFORMATION

The present application is a division of U.S. application Ser. No. 12/514,674, which was published in the English language as US 2010/0100971 on Apr. 22, 2010, and which was a 35 USC §371 application of PCT/IB07/54477, filed on Nov. 5, 2007 and entitled "SYSTEM FOR EMBEDDING DATA", which was published in the English language with International Publication Number WO 2008/059393, and which claims the benefit of priority based on Israel Patent Application serial number 179351, filed Nov. 16 2006 and the benefit of priority based on Israel Patent Application serial number 182201 filed Mar. 26, 2007.

FIELD OF THE INVENTION

The present invention relates to data embedding systems, and particularly to data embedding systems using unique identification as input.

BACKGROUND OF THE INVENTION

With the recent advances in Internet content distribution, including peer-to-peer networks and real-time video streaming systems, in order to prevent unauthorized distribution of content, it becomes important to embed data in video to trace the point of distribution. The point of distribution is often an authorized viewer, such as a cinema where pirated copies are made with camcorders, or a set-top-box TV decoder whose output is captured and re-encoded into a video file. After tracing the source, measures can be taken to prevent further unauthorized distribution.

Embedding signals in video is a rich field both in academic research and commercial inventions. Covert watermarking in the compressed (MPEG) domain is well known in the art, as are overt watermarks that appear as bitmaps on top of the video, and steganographic watermarks.

Digital Watermarking of Visual Data: State of the Art and New Trends, by M. Barni, F. Bartolini and A. Piva., Congrès Signal processing X: Theories and Applications (Tampere, 4-8 Sep. 2000), EUPSICO 2000: European Signal Processing Conference No 10, Tampere, Finland (Apr. 9, 2000), briefly reviews the state of the art in digital watermarking of visual data. A communication perspective is adopted to identify the main issues in digital watermarking and to present the most common solutions adopted by the research community. The authors first consider the various approaches to watermark embedding and hiding. The communication channel is then taken into account, and the main research trends in attack modeling are overviewed. Particular attention is paid to watermark recovery due to the impact it has on the final reliability of the whole watermarking system.

Multichannel Watermarking of Color Images, by M. Barni, F. Bartolini and A. Piva., published in IEEE Transactions on Circuits and Systems for Video Technology, Vol. 12, No. 3, March 2002, describes that in the field of image watermarking, research has been mainly focused on grayscale image watermarking, whereas the extension to the color case is usually accomplished by marking the image luminance, or by processing each color channel separately. In this paper, a DCT domain watermarking technique expressly designed to exploit the peculiarities of color images is presented. The watermark is hidden within the data by modifying a subset of full-frame DCT coefficients of each color channel. Detection is based on a global correlation measure which is computed by taking into account the information conveyed by the three color channels as well as their interdependency. To ultimately decide whether or not the image contains the watermark, the correlation value is compared to a threshold. With respect to existing grayscale algorithms, a new approach to threshold selection is proposed, which permits reducing the probability of missed detection to a minimum, while ensuring a given false detection probability. Experimental results, as well as theoretical analysis, are presented to demonstrate the validity of the new approach with respect to algorithms operating on image luminance only.

Digital Watermarking for 3D Polygons using Multiresolution Wavelet Decomposition, by Satoshi Kanai, Hiroaki Date, and Takeshi Kishinami, available on the World Wide Web at citeseer.ist.psu.edu/504450.html, describes that recently much interest is being taken in methods to protect the copyright of digital data and preventing illegal duplication of it. However, in the area of CAD/CAM and CG, there are no effective ways to protect the copyright of 3D geometric models. As a first step to solve this problem, a new digital watermarking method for 3D polygonal models is introduced in this paper. Watermarking is one of the copyright protection methods where an invisible watermark is secretly embedded into the original data. The proposed watermarking method is based on wavelet transform (WT) and multiresolution representation (MRR) of the polygonal model. The watermark can be embedded in the large wavelet coefficient vectors at various resolution levels of the MRR. This makes the embedded watermark imperceptible and invariant to the affine transformation. And also makes the control of the geometric error caused by the watermarking reliable. First the requirements and features of the proposed watermarking method are discussed. Second the mathematical formulations of WT and MRR of the polygonal model are shown. Third the algorithm of embedding and extracting the watermark is proposed. Finally, the effectiveness of the proposed watermarking method is shown through several simulation results.

U.S. Pat. No. 7,068,809 of Stach describes a method wherein segmentation techniques are used in methods for embedding and detecting digital watermarks in multimedia signals, such as images, video and audio. A digital watermark embedder segments a media signal into arbitrary shaped regions based on a signal characteristic, such as a similarity measure, texture measure, shape measure or luminance or other color value extrema measure. The attributes of these regions are then used to adapt an auxiliary signal such that it is more effectively hidden in the media signal. In one example implementation, the segmentation process takes advantage of a human perceptibility model to group samples of a media signal into contiguous regions based on their similarities. Attributes of the region, such as its frequency characteristics, are then adapted to the frequency characteristics of a desired watermark signal. One embedding method adjusts a feature of the region to embed elements of an auxiliary signal, such as an error correction encoded message signal. The detecting method re-computes the segmentation, calculates the same features, and maps the feature values to symbols to reconstruct an estimate of the auxiliary signal. The auxiliary signal is then demodulated or decoded to recover the message using error correction decoding/demodulation operations.

U.S. Pat. No. 6,950,532 of Schumann et al. describes a visual copyright protection system, the visual copyright protection system including input content, a disruption processor, and output content. The disruption processor inserts disruptive content to the input content creating output content that impedes the ability of optical recording devices to make useful copies of output content.

The following references are also believed to reflect the present state of the art:

U.S. Pat. No. 6,760,463 to Rhoads;
U.S. Pat. No. 6,721,440 to Reed et al.; and
WO 02/07362 of Digimarc Corp.

The disclosures of all references mentioned above and throughout the present specification, as well as the disclosures of all references mentioned in those references, are hereby incorporated herein by reference.

SUMMARY OF THE INVENTION

The present invention seeks to provide an improved video watermarking system.

There is thus provided in accordance with a preferred embodiment of the present invention a method including receiving marking information, determining, at least in part, based on the marking information, a plurality of color element additives, adding the plurality of color element additives to at least one color element of a video frame, wherein the at least one color element includes a color element R, a color element G, and a color element B.

Further in accordance with a preferred embodiment of the present invention the marking information includes information identifying a rendering device.

Still further in accordance with a preferred embodiment of the present invention the information identifying a rendering device includes a unique device identifier.

Additionally in accordance with a preferred embodiment of the present invention the marking information includes a copyright mark.

Moreover in accordance with a preferred embodiment of the present invention marking information includes access rights data.

Further in accordance with a preferred embodiment of the present invention the access rights data include playback/copying permission.

Still further in accordance with a preferred embodiment of the present invention the at least one color element includes a Red-Green-Blue color element.

Additionally in accordance with a preferred embodiment of the present invention the at least one color element includes a chrominance/luminance color element.

Moreover in accordance with a preferred embodiment of the present invention the chrominance/luminance color element includes a YCbCr chrominance/luminance color element.

Further in accordance with a preferred embodiment of the present invention the chrominance/luminance color element includes a YPbPr chrominance/luminance color element.

Still further in accordance with a preferred embodiment of the present invention the chrominance/luminance color element includes a YDbDr chrominance/luminance color element.

Additionally in accordance with a preferred embodiment of the present invention the chrominance/luminance color element includes a xvYCC chrominance/luminance color element.

Further in accordance with a preferred embodiment of the present invention the determining the plurality of color element additives includes, at least in part providing a variable R(t), a variable G(t), and a variable B(t), each of R(t), G(t), and B(t) denoting one of the plurality of color element additives, providing a variable A, the variable A denoting a wave amplitude, providing a variable t, the variable t denoting a frame number, providing a variable $f_R$, a variable $f_G$, and a variable $f_B$, the variable $f_R$, the variable $f_G$, and the variable $f_B$ each denoting one of a plurality of values determined based, at least in part, on the marking information, providing a variable $\tau$, the variable $\tau$ denoting a base wavelength, providing a variable $\phi$, the variable $\phi$ denoting a wave phase, providing a constant a, denoting a base frequency, and determining $$R(t) = A * \sin\left(\frac{2\pi(f_R + a)}{\tau}(t + \phi_R)\right)$$

$$G(t) = A * \sin\left(\frac{2\pi(f_G + a)}{\tau}(t + \phi_G)\right)$$

$$B(t) = A * \sin\left(\frac{2\pi(f_B + a)}{\tau}(t + \phi_B)\right).$$

Still further in accordance with a preferred embodiment of the present invention R(t), G(t), and B(t) are each rounded to an integer value.

Additionally in accordance with a preferred embodiment of the present invention each of the values denoted by the variable $f_R$, the variable $f_G$, and the variable $f_B$ includes a binary value.

Moreover in accordance with a preferred embodiment of the present invention A includes a value sufficiently low as to not substantially cause a change in color intensity.

Further in accordance with a preferred embodiment of the present invention A includes a value sufficiently high as to be substantially distinct upon detection, such that A includes a value noticeable above detected background noise.

Still further in accordance with a preferred embodiment of the present invention A includes a value in a range of 1-4% of total amplitude.

Additionally in accordance with a preferred embodiment of the present invention, $1 \leq A \leq 10$.

Moreover in accordance with a preferred embodiment of the present invention, $180 \leq \tau \leq 3000$.

Further in accordance with a preferred embodiment of the present invention $\phi$ is randomly selected.

Still further in accordance with a preferred embodiment of the present invention $\phi$ is randomly selected each time a new byte of marking information is utilized as input to determine a value of the variable $f_R$, a value of the variable $f_G$, and a value of the variable $f_B$.

Additionally in accordance with a preferred embodiment of the present invention a includes a value such that $0 \leq a \leq 80$.

Moreover in accordance with a preferred embodiment of the present invention the method further includes modifying a value of R(t), G(t), and B(t) by a fractional multiplier before the adding.

Further in accordance with a preferred embodiment of the present invention the fractional multiplier is incrementally increased until the fractional multiplier is equal to one (1).

Still further in accordance with a preferred embodiment of the present invention the variable R(t), the variable G(t), and the variable B(t) are applied to the color element R, the color element G, and the color element B, respectively, and the applying of variable R(t), the variable G(t), and the variable B(t) to the color element R, the color element G, and the color element B, respectively, includes applying to every pixel included in a video screen.

Additionally in accordance with a preferred embodiment of the present invention the variable R(t), the variable G(t), and the variable B(t) are applied to a color element R, a color element G, and a color element B, respectively, such that the color element R, the color element G, and the color element B do not exceed a maximum value allowed for each the color element in a color representation system.

Moreover in accordance with a preferred embodiment of the present invention the color representation system includes a Red-Green-Blue color element.

Further in accordance with a preferred embodiment of the present invention the color representation system includes a chrominance/luminance color element.

Still further in accordance with a preferred embodiment of the present invention the variable R(t), the variable G(t), and the variable B(t) are applied to a color element R, a color element G, and a color element B, respectively, such that the color element R, the color element G, and the color element B do not fall below a minimum value allowed for each the color element in a color representation system.

Additionally in accordance with a preferred embodiment of the present invention the color representation system includes a Red-Green-Blue color element.

Moreover in accordance with a preferred embodiment of the present invention the color representation system includes a chrominance/luminance color element.

There is also provided in accordance with another preferred embodiment of the present invention a method including providing a plurality of video frames, segmenting the plurality of video frames into groups of video frames, receiving marking information, determining, based at least in part, on the marking information, a plurality of color element additives, selecting some of the groups of video frames for modification, and adding the plurality of color element additives to a plurality of color elements of a plurality of video frames included in the selected groups of video frames.

Further in accordance with a preferred embodiment of the present invention no groups of video frames are selected for modification for a period of time between 0.25 and 0.75 of a base wavelength.

Still further in accordance with a preferred embodiment of the present invention the marking information includes information identifying a rendering device.

Additionally in accordance with a preferred embodiment of the present invention the information identifying a rendering device includes a unique device identifier.

Moreover in accordance with a preferred embodiment of the present invention the marking information includes a copyright mark.

Further in accordance with a preferred embodiment of the present invention the marking information includes access rights data.

Still further in accordance with a preferred embodiment of the present invention the access rights data include playback/copying permission.

Additionally in accordance with a preferred embodiment of the present invention the color element includes a Red-Green-Blue color element.

Moreover in accordance with a preferred embodiment of the present invention the color element includes a chrominance/luminance color element.

Further in accordance with a preferred embodiment of the present invention the chrominance/luminance color element includes a YCbCr chrominance/luminance color element.

Still further in accordance with a preferred embodiment of the present invention the chrominance/luminance color element includes a YPbPr chrominance/luminance color element.

Additionally in accordance with a preferred embodiment of the present invention the chrominance/luminance color element includes a YDbDr chrominance/luminance color element.

Moreover in accordance with a preferred embodiment of the present invention the chrominance/luminance color element includes a xvYCC chrominance/luminance color element.

Further in accordance with a preferred embodiment of the present invention the determining the plurality of color element additives includes, at least in part providing a variable R(t), a variable G(t), and a variable B(t) each of R(t), G(t), and B(t), each denoting one of the plurality of color element additives, providing a variable A, the variable A denoting a wave amplitude, providing a variable t, the variable t denoting a frame number, providing a variable $f_R$, a variable $f_G$, and a variable $f_B$, the variable $f_R$, the variable $f_G$, and the variable $f_B$ each denoting one of a plurality of binary values determined based, at least in part, on the marking information, providing a variable $\tau$, the variable $\tau$ denoting a base wavelength, providing a variable $\phi$, the variable $\phi$ denoting a wave phase, providing a constant a, denoting a base frequency, and determining $$R(t) = A * \sin\left(\frac{2\pi(f_R + a)}{\tau}(t + \phi_R)\right)$$

$$G(t) = A * \sin\left(\frac{2\pi(f_G + a)}{\tau}(t + \phi_G)\right)$$

$$B(t) = A * \sin\left(\frac{2\pi(f_B + a)}{\tau}(t + \phi_B)\right).$$

Still further in accordance with a preferred embodiment of the present invention R(t), G(t), and B(t) are each rounded to an integer value.

Additionally in accordance with a preferred embodiment of the present invention each of the values denoted by the variable $f_R$, the variable $f_G$, and the variable $f_B$ includes a binary value.

Moreover in accordance with a preferred embodiment of the present invention A includes a value sufficiently low as to not substantially cause a change in color intensity.

Further in accordance with a preferred embodiment of the present invention A includes a value sufficiently high as to be substantially distinct upon detection, such that A includes a value noticeable above detected background noise.

Still further in accordance with a preferred embodiment of the present invention A includes a value in a range of 1-4% of total amplitude.

Additionally in accordance with a preferred embodiment of the present invention, $1 \leq A \leq 10$.

Moreover in accordance with a preferred embodiment of the present invention, $180 \leq \tau \leq 3000$.

Further in accordance with a preferred embodiment of the present invention $\phi$ is randomly selected.

Still further in accordance with a preferred embodiment of the present invention $\phi$ is randomly selected each time a new byte of marking information is utilized as input to determine a value of the variable $f_R$, a value of the variable $f_G$, and a value of the variable $f_B$.

Additionally in accordance with a preferred embodiment of the present invention a includes a value such that $0 \leq a \leq 80$.

Moreover in accordance with a preferred embodiment of the present invention the method further includes modifying a value of R(t), G(t), and B(t) by a fractional multiplier before the adding.

Further in accordance with a preferred embodiment of the present invention fractional multiplier is incrementally increased until the fractional multiplier is equal to one (1).

Still further in accordance with a preferred embodiment of the present invention the variable R(t), the variable G(t), and the variable B(t) are applied to the color element R, the color element G, and the color element B, respectively, and the applying of variable R(t), the variable G(t), and the variable B(t) to the color element R, the color element G, and the color element B, respectively, includes applying to every pixel included in a video screen.

Additionally in accordance with a preferred embodiment of the present invention the variable R(t), the variable G(t), and the variable B(t) are applied to a color element R, a color element G, and a color element B, respectively, such that the color element R, the color element G, and the color element B do not exceed a maximum value allowed for each the color element in a color representation system.

Moreover in accordance with a preferred embodiment of the present invention the color representation system includes a Red-Green-Blue color element.

Further in accordance with a preferred embodiment of the present invention the color representation system includes a chrominance/luminance color element.

Still further in accordance with a preferred embodiment of the present invention the variable R(t), the variable G(t), and the variable B(t) are applied to a color element R, a color element G, and a color element B, respectively, such that the color element R, the color element G, and the color element B do not fall below a minimum value allowed for each the color element in a color representation system.

Additionally in accordance with a preferred embodiment of the present invention the color representation system includes a Red-Green-Blue color element.

Moreover in accordance with a preferred embodiment of the present invention the color representation system includes a chrominance/luminance color element.

There is also provided in accordance with still another preferred embodiment of the present invention a method including capturing a video stream, segmenting the video stream into a plurality of video segments, splitting each segment of the plurality of video segments into a plurality of video frames included therein, for each one of the plurality of video segments determining a color mass for every individual video frame of the plurality of video frames by summing color value coordinates included in the individual video frame, aggregating a result of the determining into three series of color value coordinates for every individual video segment over the plurality of video segments, each one of the three series of color value coordinates corresponding to a distinct color element, for each one of the three series of color value coordinates applying a discrete Fourier transform to the series of color value coordinates, determining, as a result of the discrete Fourier transform, an intensity of a plurality of frequencies, determining a peak frequency from among the plurality of frequencies, and determining at least a portion of marking information as a result of the determining the peak frequency, and combining the determined at least a portion of marking information for each one of the plurality of video segments, thereby determining the marking information.

Further in accordance with a preferred embodiment of the present invention the capturing a video stream includes capturing a video stream from a streaming content network.

Still further in accordance with a preferred embodiment of the present invention the capturing a video stream includes downloading the video stream from a peer-to-peer file content sharing network.

Additionally in accordance with a preferred embodiment of the present invention the capturing a video stream includes capturing the stream from an illegal content distribution scheme.

Moreover in accordance with a preferred embodiment of the present invention the illegal content distribution scheme includes an online illegal content distribution scheme.

Further in accordance with a preferred embodiment of the present invention the illegal content distribution scheme includes an offline illegal content distribution scheme.

Still further in accordance with a preferred embodiment of the present invention the illegal content distribution scheme includes retail sale of pirated DVDs.

Additionally in accordance with a preferred embodiment of the present invention each video segment of the plurality of video segments includes an at least partially overlapping video segment.

Moreover in accordance with a preferred embodiment of the present invention each video segment of the plurality of video segments is of a length approximately equal to 1.5 times a base wavelength.

Further in accordance with a preferred embodiment of the present invention the base wavelength, denoted $\tau$, is positive.

Still further in accordance with a preferred embodiment of the present invention the color value coordinates are included in a Red-Green-Blue color value coordinate system.

Additionally in accordance with a preferred embodiment of the present invention the color value coordinates are included in a chrominance/luminance color value coordinate system.

Moreover in accordance with a preferred embodiment of the present invention the chrominance/luminance color value coordinate system includes a YCbCr chrominance/luminance color value coordinate system.

Further in accordance with a preferred embodiment of the present invention the chrominance/luminance color value coordinate system includes a YPbPr chrominance/luminance color value coordinate system.

Still further in accordance with a preferred embodiment of the present invention the chrominance/luminance color value coordinate system includes a YDbDr chrominance/luminance color value coordinate system.

Additionally in accordance with a preferred embodiment of the present invention the chrominance/luminance color value coordinate system includes a xvYCC chrominance/luminance color value coordinate system.

Moreover in accordance with a preferred embodiment of the present invention the method also includes providing a variable R, a variable G, and a variable B, the variable R, the variable G, and the variable B each respectively denoting a color value coordinate, providing a variable R'(t), a variable G'(t), and a variable B'(t), the variable R'(t), the variable G'(t), and the variable B'(t) each denoting a series of sums of color value components in a plurality of frames, providing a variable t, the variable t denoting a frame number, providing a variable co, the variable co denoting a frequency, providing a variable L, the variable L denoting a length, in frames, of a video segment presently undergoing analysis, providing a variable C and a variable S, the variable C denoting a cosine portion of the discrete Fourier transform, and the variable S denoting a sine portion of the discrete Fourier transform, providing a variable A, the variable A denoting an intensity of frequency ω in the video segment presently undergoing analysis, determining $$A(\omega) = 2\sqrt{C(\omega)^2 + S(\omega)^2} \text{ for}$$

$$C(\omega) = \sum_{t=0}^{L-1} R'(t) \cdot \cos(\omega t)$$

$$S(\omega) = \sum_{t=0}^{L-1} R'(t) \cdot \sin(\omega t),$$

determining $$A(\omega) = 2\sqrt{C(\omega)^2 + S(\omega)^2} \text{ for}$$

$$C(\omega) = \sum_{t=0}^{L-1} G'(t) \cdot \cos(\omega t)$$

$$S(\omega) = \sum_{t=0}^{L-1} G'(t) \cdot \sin(\omega t), \text{ and}$$

determining $$A(\omega) = 2\sqrt{C(\omega)^2 + S(\omega)^2} \text{ for}$$

$$C(\omega) = \sum_{t=0}^{L-1} B'(t) \cdot \cos(\omega t)$$

$$S(\omega) = \sum_{t=0}^{L-1} B'(t) \cdot \sin(\omega t).$$

Further in accordance with a preferred embodiment of the present invention ω includes a value such that ω≥0.

There is also provided in accordance with still another preferred embodiment of the present invention a system including a marking information receiver, a determiner, which determines, at least in part, based on the received marking information, a plurality of color element additives, a color element adder, which adds the plurality of color element additives to at least one color element of a video frame, wherein the at least one color element includes a color element R, a color element G, and a color element B.

There is also provided in accordance with still another preferred embodiment of the present invention a system including a plurality of video frames, a segmenter, which segments the plurality of video frames into groups of video frames, a marking information receiver, a determiner, which determines, at least in part, based on the received marking information, a plurality of color element additives, a selector, which selects some of the groups of video frames for modification, and a color element adder, which adds a plurality of color element additives to a plurality of color elements of a plurality of video frames included in the selected groups of video frames.

There is also provided in accordance with still another preferred embodiment of the present invention a system including a captured video stream, a segmenter, which segments the video stream into a plurality of video segments, a splitter, which splits each segment of the plurality of video segments into a plurality of video frames included therein, a first determiner, which determines for each one of the plurality of video segments, a color mass for every individual video frame of the plurality of video frames by summing color value coordinates included in the individual video frame, an aggregator which aggregates results of the first determiner into three series of color value coordinates for every individual video segment over the plurality of video segments, each one of the three series of color value coordinates corresponding to a distinct color element, a discrete Fourier transform applier, which applies a discrete Fourier transform to each one of the three series of color value coordinates, a second determiner, which determines, as a result of the discrete Fourier transform, an intensity of a plurality of frequencies for each one of the three series of color value coordinates, a third determiner, which determines a peak frequency from among the plurality of frequencies for each one of the three series of color value coordinates, a marking information determiner, which determines at least a portion of marking information as a result of the determining the peak frequency for each one of the three series of color value coordinates, and a combiner which combines the determined at least a portion of marking information for each one of the plurality of video segments, thereby determining the marking information.

There is also provided in accordance with still another preferred embodiment of the present invention a signal including a video stream including a plurality of video frames, each of the plurality of video frames including a plurality of pixels, and each pixel of the plurality of pixels including a plurality of color elements, wherein at least one of the color elements included in one of the pixels included in one of the plurality of video frames has been modified by having a color element additive added thereto.

There is also provided in accordance with still another preferred embodiment of the present invention a signal including a video stream including a plurality of video frames, each of the plurality of video frames including a plurality of pixels, and each pixel of the plurality of pixels including a plurality of color elements, wherein the plurality of video frames has been segmented into groups of video frames, a plurality of color element additives has been determined, based, at least in part, on received marking information, some of the groups of video frames were selected for modification, and the plurality of color element additives has been added to the plurality of color elements included in the selected groups of video frames.

There is also provided in accordance with still another preferred embodiment of the present invention a storage medium including a video stream including a plurality of video frames, each of the plurality of video frames including a plurality of pixels, and each pixel of the plurality of pixels including a plurality of color elements, wherein at least one of the color elements included in one of the pixels included in one of the plurality of video frames has been modified by having a color element additive added thereto.

There is also provided in accordance with still another preferred embodiment of the present invention a storage medium including a video stream including a plurality of video frames, each of the plurality of video frames including a plurality of pixels, and each pixel of the plurality of pixels including a plurality of color elements wherein the plurality of video frames has been segmented into groups of video frames, a plurality of color element additives has been determined, based, at least in part, on received marking information, some of the groups of video frames were selected for modification, and the plurality of color element additives has been added to the plurality of color elements included in the selected groups of video frames.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
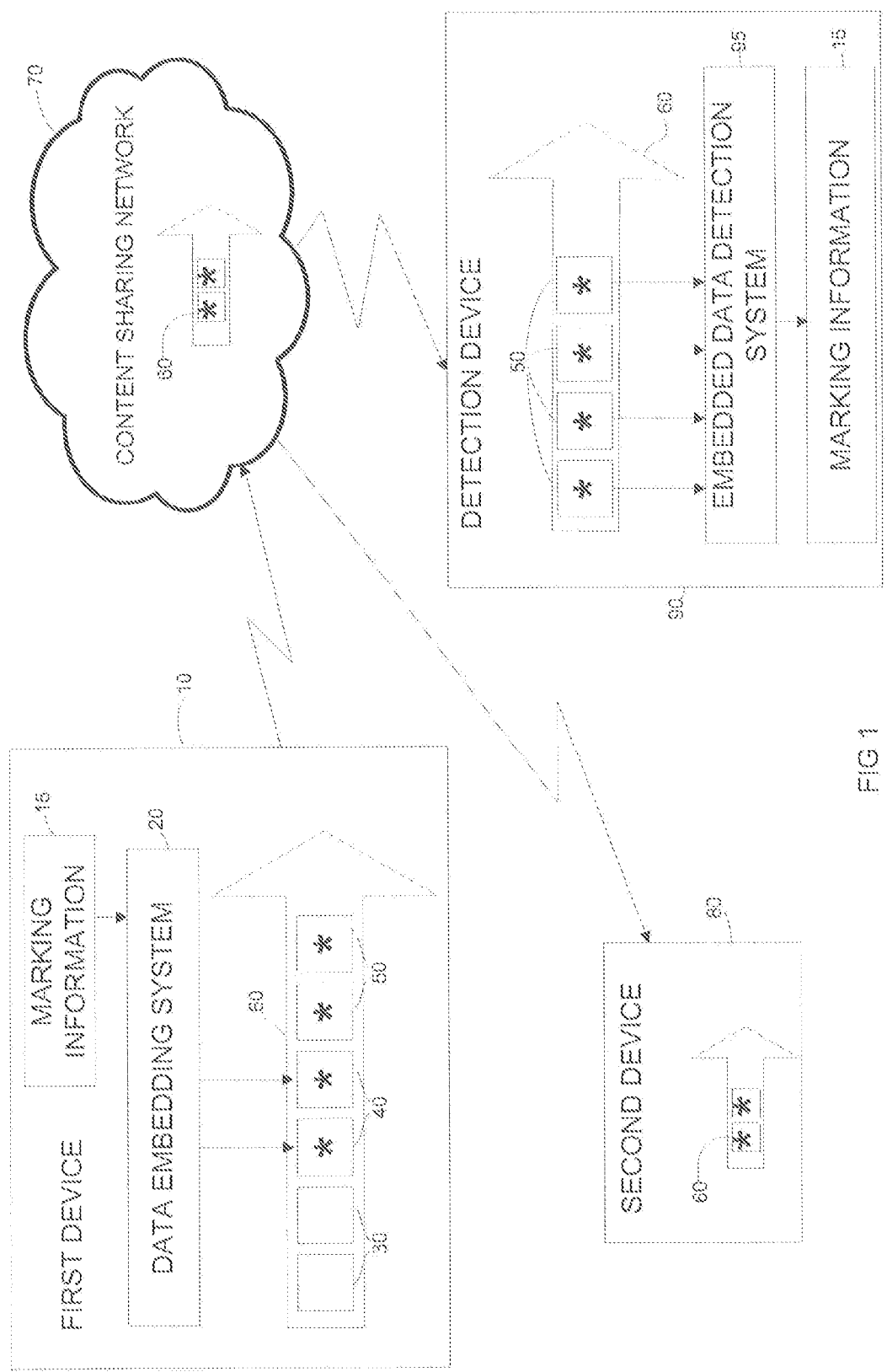
FIG. 1 is a simplified block drawing of a video data embedding system constructed and operative in accordance with a preferred embodiment of the present invention.

Reference is now made to FIG. 1, which is a simplified block drawing of a video data embedding system constructed and operative in accordance with a preferred embodiment of the present invention. The system of FIG. 1 comprises a content rendering device 10. The content rendering device 10 preferably comprises marking information 15 and a data embedding system 20.

The marking information 15 preferably comprises any appropriate information, for example and without limiting the generality of the foregoing, information identifying the rendering device 10, and preferably a unique device ID for the content rendering device 10. Alternatively and preferably, a copyright mark or other access rights data, for example and without limiting the generality of the foregoing, the playback/copying permissions to be obeyed by the content rendering device 10. Those skilled in the art will appreciate that copyright information may, for example and without limiting the generality of the foregoing, be a single bit, indicating copyrighted/not copyrighted. Alternatively, copyright may be indicated in a plurality of bits, such as, and without limiting the generality of the foregoing, permission to copy but not to burn to CD. It is assumed that authorized playback devices respect such signals, while unauthorized playback devices are assumed not to respect such signals. It is appreciated that combinations of appropriate types of identifying information may alternatively be used as the marking information 15.

The data embedding system 20 is preferably operative to inject embedded data, depicted in FIG. 1 as an asterisk, *, onto frames 30, 40, 50 of a video stream 60.

The operation of the system of FIG. 1 is now described. The video stream 60 is depicted as comprising three distinct types of video frames:
frames not yet comprising embedded data 30;
frames presently being embedded with data 40; and
frames already embedded with data 50.

The data embedding system 20 preferably receives the marking information 15 as an input, generates the embedded data, depicted as an asterisk, *, and injects a watermark (termed herein "WM") into the frames presently being embedded with data 40.

Content comprising the video stream 60, now comprising a plurality of frames already embedded with data 50, may be uploaded or otherwise made available on a content sharing network 70. The content sharing network 70 typically comprises a either a streaming content sharing network or a peer-to-peer content sharing network. Alternatively, the content sharing network 70 may comprise any appropriate type of online and/or offline content distribution scheme, for example and without limiting the generality of the foregoing, retail sale of pirated DVDs. A second device 80 may then acquire the video stream 60 from the content sharing network 70.

A broadcaster, a content owner, or other appropriately authorized agent may also acquire the video stream 60 from the content sharing network 70. Upon acquisition of the video stream 60 from the content sharing network 70 by the broadcaster, content owner, or other interested stakeholder, the video stream 60 is preferably input into a detection device 90. The detection device 90 preferably extracts the embedded data, depicted as an asterisk, *, from each of the frames already embedded with data 50 comprised in the video stream 60. The extracted embedded data is then input into a embedded data detection system 95. The embedded data detection system 95 preferably is able to determine the injected marking information 15 from the input embedded data.

Figure 2:
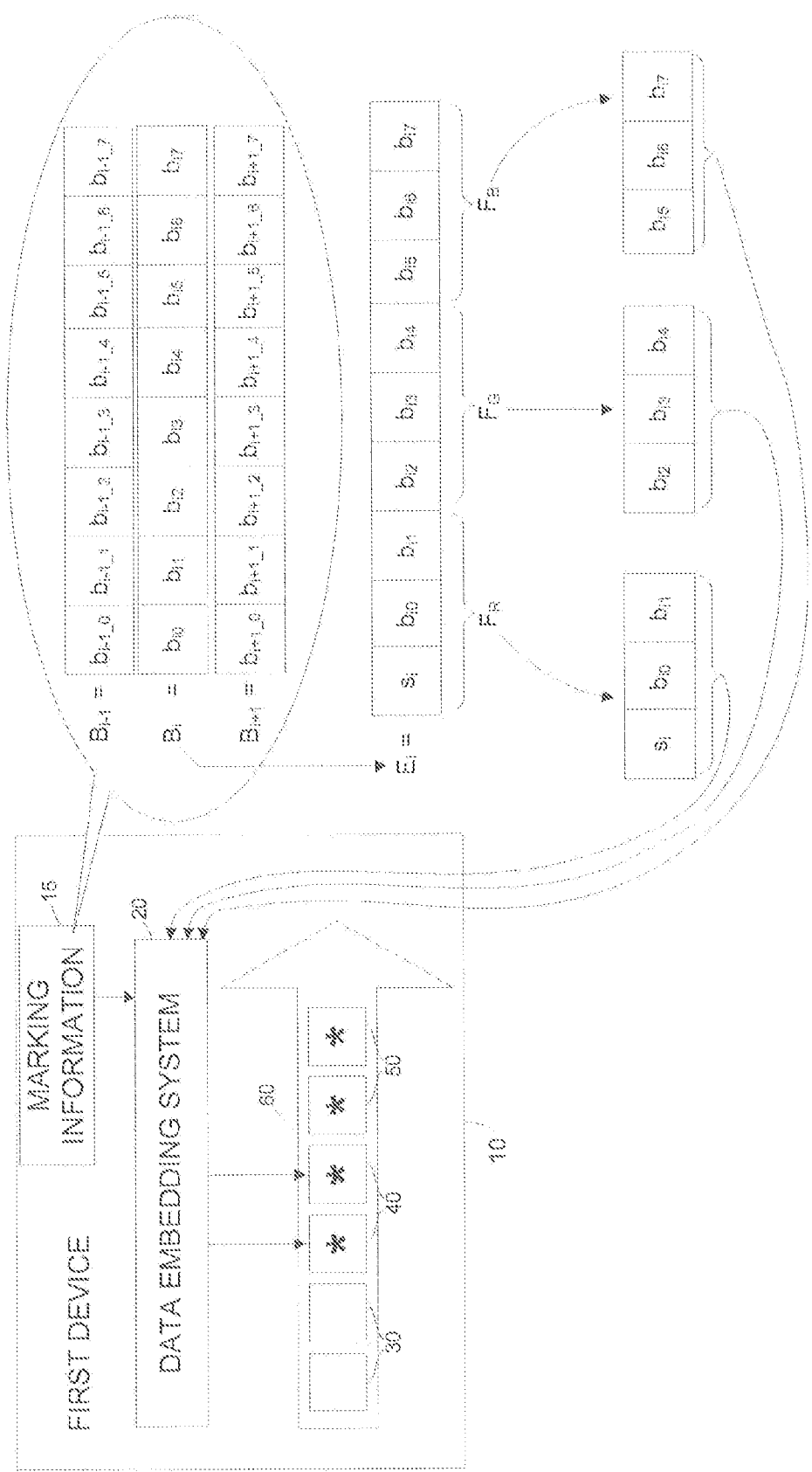
FIG. 2 is a simplified block drawing depicting manipulation on input bits in the video data embedding system of FIG. 1.

Reference is now additionally made to FIG. 2, which is a simplified block drawing depicting manipulation on input bits in the video data embedding system of FIG. 1. The content rendering device 10 of FIG. 1 is depicted in FIG. 2. It is appreciated that a single byte, $B_i$, of input data is depicted (among a plurality of bytes) being processed for injection as a component of the embedded data. The injection occurs over a large number of frames, denoted below as τ.

Those skilled in the art will appreciate that a digital video frame is presented to a viewer as an ordered arrangement of pixels on a viewing monitor or screen. Certain changes may be made to one or more of the pixels which will, typically, not be perceptible to the viewer. For example and without limiting the generality of the foregoing, a color element of the pixel may be represented by a triad of Red-Green-Blue values, typically expressed as values ranging from 0-255. A slight change in the value of the Red-Green-Blue values, for example and without limiting the generality of the foregoing, from 179-221-18 to 184-220-20 will, typically, not be perceptible to the viewer.

Those skilled in the art will appreciate that pixel color may alternatively be expressed in any appropriate color space, such as any of the well known Chrominance/Luminance systems (for instance, YCbCr; YPbPr; YDbDr), or according to the xvYCC standard, IEC 61966-2-4. For simplicity of discussion, pixel color is expressed herein, in a non-limiting manner, as a RGB triplet.

As discussed above, the data embedding system 20 receives the marking information 15 as input. The marking information 15 is expressed as a series of bytes: $B_0, B_1, \ldots, B_k$.

Each byte comprises eight bits:

$$B_i = \boxed{b_{i0}}\boxed{b_{i1}}\boxed{b_{i2}}\boxed{b_{i3}}\boxed{b_{i4}}\boxed{b_{i5}}\boxed{b_{i6}}\boxed{b_{i7}}$$

Each byte $B_i$ is then extended with one bit to extended byte $E_i$:

$$E_i = \boxed{s_i}\boxed{b_{i0}}\boxed{b_{i1}}\boxed{b_{i2}}\boxed{b_{i3}}\boxed{b_{i4}}\boxed{b_{i5}}\boxed{b_{i6}}\boxed{b_{i7}}$$

Where $s_i=1$ for the first extended byte, and 0 for all other extended bytes.

$E_i$ is then split into three binary values;

$$f_R = \boxed{s_i}\boxed{b_{i0}}\boxed{b_{i1}}$$
$$f_G = \boxed{b_{i2}}\boxed{b_{i3}}\boxed{b_{i4}}$$
and
$$f_B = \boxed{b_{i5}}\boxed{b_{i6}}\boxed{b_{i7}}$$

where $f_R$, $f_G$, and $f_B$ comprise a triplet of binary values.
For example and without limiting the generality of the foregoing let:
$f_R$=101 (binary)=5 (decimal);
$f_G$=010 (binary)=2 (decimal); and
$f_B$=110 (binary)=6 (decimal).
It is appreciated that the above values of $f_R$, $f_G$, and $f_B$ have been selected on a purely arbitrary basis, and, as such, comprise but one possible example.

It is further appreciated that alternative preferred methods of segmenting bytes of the marking information 15 may also be used. For example and without limiting the generality of the foregoing, using more than one bit to indicate the position of a byte in the sequence $B_0, B_1, \ldots, B_k$, or using portion sizes of more or less than a byte, for instance 2 bits of position information per 8 bits of identifying information enables appending a precise position to every byte of a 4-byte instance of marking information 15. It is appreciated that any bit width and any corresponding space size between 1 and infinity comprises a possible preferred embodiment of the present invention.

In the above example, $f_R$, $f_G$, and $f_B$ each comprise one in a space of eight possible frequencies of a sine wave. It is appreciated that by changing the method of segmentation of the marking information 15, other preferred implementations of $f_R$, $f_G$, and $f_B$ are possible. For instance, in a preferred embodiment of the present invention, extended bytes $E_1$ are preferably derived from 12-bit portions of the marking information 15, without adding positional bits. $E_i$ then comprises 12 bits, and $f_R$, $f_G$, and $f_B$ each comprise 4 bits:
$E_i=b_{i0}b_{i1}b_{i2}b_{i3}b_{i4}b_{i5}b_{i6}b_{i7}b_{i8}b_{i9}b_{i10}b_{i11}$
then:
$f_R=b_{i0}b_{i1}b_{i2}b_{i3}$;
$f_G=b_{i4}b_{i5}b_{i6}b_{i7}$;
$f_B=b_{i8}b_{i9}b_{i10}b_{i11}$.

In which case, $f_R$, $f_G$, and $f_B$ each comprise one of a space of sixteen different frequencies of a sine wave.

It is appreciated that segmentation of marking information preferably need not comprise values comprising the same number of bits as each other with respect to frequencies. For example and without limiting the generality of the foregoing, $f_G$ can be assigned a 3-bit width while $f_R$ and $f_B$ are 4 bits wide.

The eight frequencies mentioned above, preferably provide inputs into the following equations, in order to define a change in the corresponding color space dimensions, as follows:

$$R(t) = A * \sin\left(\frac{2\pi(f_R + a)}{\tau}(t + \phi_R)\right)$$

$$G(t) = A * \sin\left(\frac{2\pi(f_G + a)}{\tau}(t + \phi_G)\right)$$

$$B(t) = A * \sin\left(\frac{2\pi(f_B + a)}{\tau}(t + \phi_B)\right).$$

(It is appreciated, for example, that in a Chrominance/Luminance system, R(t) is preferably represented as Y(t), $f_R$ is preferably represented as $f_Y$, and $\phi_R$ is preferably represented as $\phi_Y$.)

Where:
t—frame number
R(t), G(t), and B(t)—the change to apply to values of R, G, and B respectively, at frame t. Those skilled in the art will appreciate that the changes R(t), G(t), and B(t) are rounded to the nearest integer in video representation systems that use integers for color component values.

A—wave amplitude. A is preferably low enough that the viewer will not notice any change in color intensity, yet high enough that, upon detection (described below with reference to FIGS. 5 and 6), will stand out above background noise. Accordingly, it is preferable that A be in the range of 1%-4% of total amplitude, and therefore, if the video pixels are defined in the R, G, B domain with values between 0 and 255, preferably $1 \leq A \leq 10$.

$\tau$—base wavelength, expressed in frames. Assuming 30 frames per second, in order to achieve reasonable detection times and to avoid causing flickering which is noticeable to the viewer at higher frequencies, $\tau$ is preferably in the range 180-3000.

$\phi$—wave phase. A random (is preferably chosen per byte $B_0$, $B_1, \ldots, B_k$. Randomly varying $\phi$ preferably causes waves of the same frequency to cancel each other out, when summed over an overly long period of time. Therefore, detection is made harder for attackers not familiar with the exact data embedding method. $\phi$ is an integer between 0 and $\tau$.

a—base frequency, comprising a constant. Numerically low frequencies are typically unusable due to associated noise levels and flicker. Given the parameters above, a preferably ranges between 0 and 80. It is preferable that the frequencies which result from an addition of a to $f_R$, $f_G$, and $f_B$ and division by ti, range between 2 Hz and 0.5 Hz. Frequencies above 2 Hz may cause jitter which is perceptible to the viewer, and thus, undesirable. Likewise, frequencies below 0.5 Hz comprise longer sine wave lengths, and thus comprise detection times which are slower, and hence, undesirable.

It is appreciated that the functions R(t), G(t), and B(t) comprise harmonic functions. Thus, $-A \leq R(t) \leq A$; $-A \leq G(t) \leq A$; and $-A \leq B(t) \leq A$.

As a non-limiting example, continuing the discussion above, where:
f=101 (bin)=5 (dec),
let:
A=5,
a=9 (chosen to be between 8 and 12),
τ=900 (a value chosen so as to be between 180-1800),
$\phi_R$=400 (0<$\phi_R$<τ), and
t=1776 (chosen arbitrarily for the present example).
Thus, for $$R(t) = A * \sin\left(\frac{2\pi(f_R + a)}{\tau}(t + \phi_R)\right),$$

$$R(t) = A * \sin[(2*\pi*(f_R + a))/\tau*(t + \varphi_R)]$$
$$= 5 * \sin(2*\pi*(5+9)*(1776+400)/900)$$
$$= 5 * \sin 28\pi * 2176/900)$$
$$= 5 * \sin \pi * 67.6978$$
$$= 5 * \sin 212.6789$$
$$= 5 * -0.8131$$
$$= -4.0655$$

As mentioned above, R(t) is rounded to the nearest integer, and therefore, the value of R in any pixel in frame t would be decreased by 4.

It is appreciated that the values of R, G, and B can never exceed the maximum imposed by the video color representation system, regardless of the values of R(t), G(t), and B(t). For example and without limiting the generality of the foregoing, in systems of RGB values between 0 and 255, R, G, and B can never go above a maximum of 255. Likewise, the value of R, G, and B can never go below a minimum of 0, regardless of the values of R(t), G(t), and B(t). For example and without limiting the generality of the foregoing, if G(t)=−3 and G=2 in frame t, after data embedding, G=0.

The data embedding system 20 preferably applies the modifications of R(t), G(t), and B(t) to an entire picture's color components for a period of about 2*τ, before taking a next extended byte, $E_{i+1}$. Specifically, the modifications of R(t), G(t), and B(t) are preferably applied to every pixel of a video screen. After each byte of the marking information 15 has been used to generate R(t), G(t), and B(t), the data embedding system 20 cycles back to $E_0$.

In some preferred embodiment of the present invention, the data embedding system 20 preferably applies no modifications for a small randomly timed break of length between ¼*τ and ¾*τ. The small randomly timed break in inserting the WM is added in order to enable waves of different phase to preferably cancel each other out, when summed over a long period of time, thereby adding an element of confusion and thereby making an attack on the data embedding system more difficult.

In some preferred embodiments of the present invention, each phase of data embedding starts with a gradual fade-in. Each modification value R(t), G(t), and B(t) is multiplied by some fraction for several frames, in order to prevent any flicker from suddenly appearing. For example and without limiting the generality of the foregoing, a first trio of R(t), G(t), and B(t) is preferably multiplied by 0.1. A second trio of R(t), G(t), and B(t) is preferably multiplied by 0.2, and so on, until the multiplicand reaches 1. It is appreciated that in preferred embodiments where values of R(t), G(t), and B(t) are multiplied by a fractional value, due to the effect of rounding to an integer, some of the multiplications result in repetitions of certain values of R(t), G(t), and B(t). For instance, if R(t) ranges from −5 to 5, then, multiplying by 0.1, 0.2, . . . 1 gives products which are going to be at most plus/minus 0.5, plus/minus 1, plus/minus 1.5, . . . plus/minus 5, meaning that because of rounding to integers, every second multiplication gets rounded, either up or down. Those skilled in the art will appreciate that, as wave phase p will have an effect on fade-in, it is not important if the fade-in is precisely timed to the amplitude.

Figure 3:
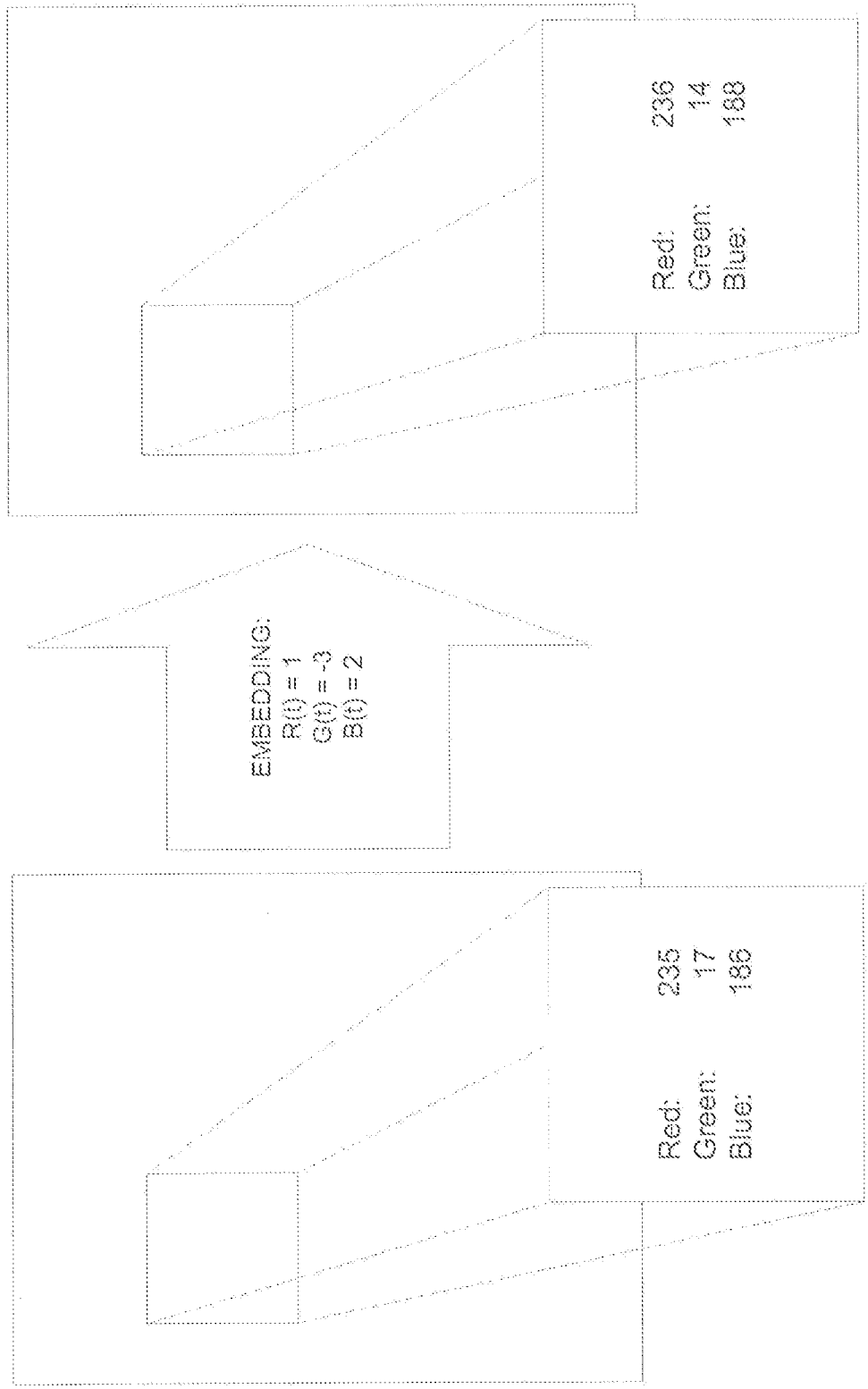
FIG. 3 is a simplified illustration depicting a single pixel comprised in a video frame before and after data embedding, according to the system of FIG. 1.

Reference is now made to FIG. 3, which is a simplified illustration depicting a single pixel comprised in a video frame before and after data embedding, according to the system of FIG. 1. FIG. 3 focuses on a single pixel, depicted, by way of example, as having Red, Green, and Blue values of: Red=235; Green=17; and Blue=186. Applying the WM method described above, and, by way of example, R(t)=1; G(t)=−3; and B(t)=2. Thus, the color values of the pixel with WM applied are Red=236; Green=14; and Blue=188.

Figure 4:
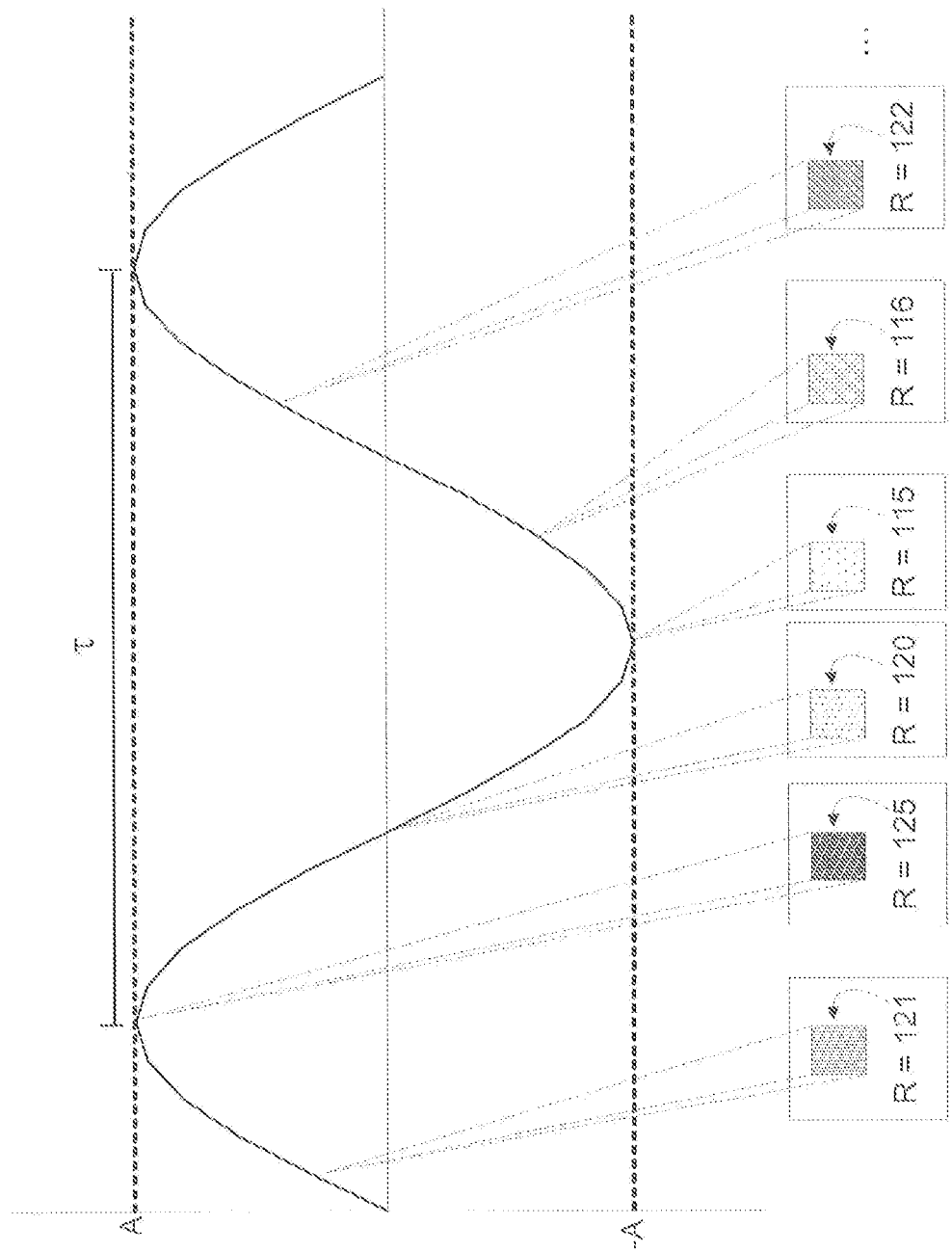
FIG. 4 is a simplified illustration depicting a plurality of individual pixels comprised in a plurality of video frames comprising embedded data, a graphical depiction of a data embedding function used, at least in part, to embed data in the plurality of video frames, and a graphical representation of an effect of the data embedding function on the pixels of individual frames within the system of FIG. 1.

Reference is now made to FIG. 4, which is a simplified illustration depicting a plurality of individual pixels comprised in a plurality of video frames comprising embedded data, a graphical depiction of a data embedding function used, at least in part, to embed data in the plurality of video frames, and a graphical representation of an effect of the data embedding function on the pixels of individual frames within the system of FIG. 1. FIG. 4 depicts a graphical representation of one of the harmonic functions described above, where the value of the function ranges from −A to A. For example and without limiting the generality of the foregoing, assume that R(t) is depicted in FIG. 4. Accordingly, the value of R(t), and the corresponding modification of the Red color value R in a given video frame is seen to fluctuate between −A and A, as R(t) fluctuates.

Those skilled in the art will appreciate that a video signal or other appropriate signal may comprise video comprising embedded data as described above with reference to FIGS. 1-4. Those skilled in the art will appreciate that video comprising embedded data as described above with reference to FIGS. 1-4 may be stored on a compact disk (CD), a digital versatile disk (DVD), flash memory, or other appropriate storage medium.

Figure 5:
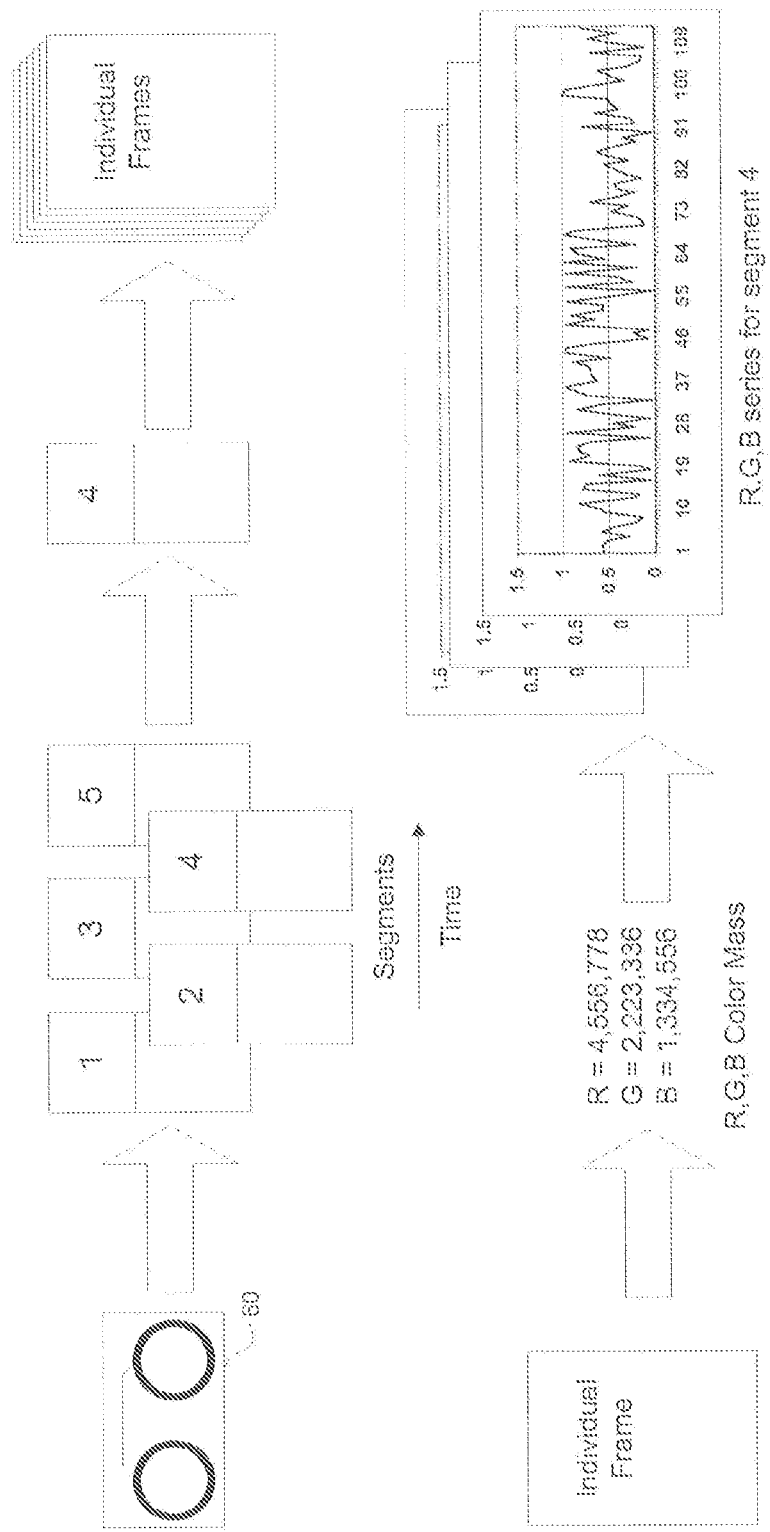
FIG. 5 is a simplified illustration of an embedded data detection portion of the video data embedding system of FIG. 1.

Reference is now made to FIG. 5, which is a simplified illustration of an embedded data detection portion of the video data embedding system of FIG. 1. A detection device 90 acquires the video stream 60 (FIG. 1), for example and without limiting the generality of the foregoing, by capturing the video stream 60 (FIG. 1) from a streaming content sharing network 70 or downloading the video stream 60 (FIG. 1) from a peer-to-peer file content sharing network 70. The detecting agent preferably splits the video stream 60 into short overlapping segments of length of approximately 1.5*τ. The detecting agent then preferably splits each segment into individual frames and preferably determines a color mass of each individual frame by summing up the R, G, B color values coordinates of each individual frame.

Summing up the R, G, B color values components of each individual frame results in three series of data being formed, one series for each component. The three series are denoted below as R'(t), G'(t) and B'(t). Each one of the three series is subjected to frequency analysis by means of Discrete Fourier Transform, with decomposition on the frequencies in the WM range, such that, for example and without limiting the generality of the foregoing, for component R:

$$C(\omega) = \sum_{t=0}^{L-1} R'(t) \cdot \cos(\omega t)$$

$$S(\omega) = \sum_{t=0}^{L-1} R'(t) \cdot \sin(\omega t)$$

$$A(\omega) = 2\sqrt{C(\omega)^2 + S(\omega)^2}$$

Where:
t—is the frame number;
ω—is a frequency, taken in the range between a and a+8, where a is the same as during injection;
L—is the length (in frames) of the video portion subjected to analysis;
C and S—are the cosine and sine parts of the transform, respectively; and
A corresponds to the intensity of frequency ω in the analyzed segment.
Similar analysis is performed for G and B.

Figure 6:
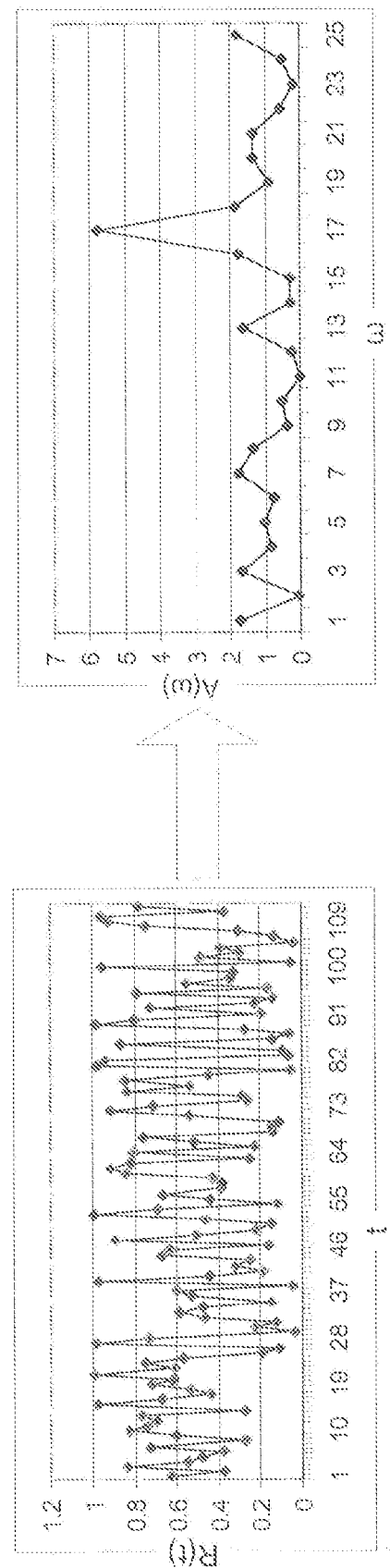
FIG. 6 is a simplified illustration depicting use of a Fourier transform in the embedded data detection portion of the video data embedding system of FIG. 1.
Figure 7:
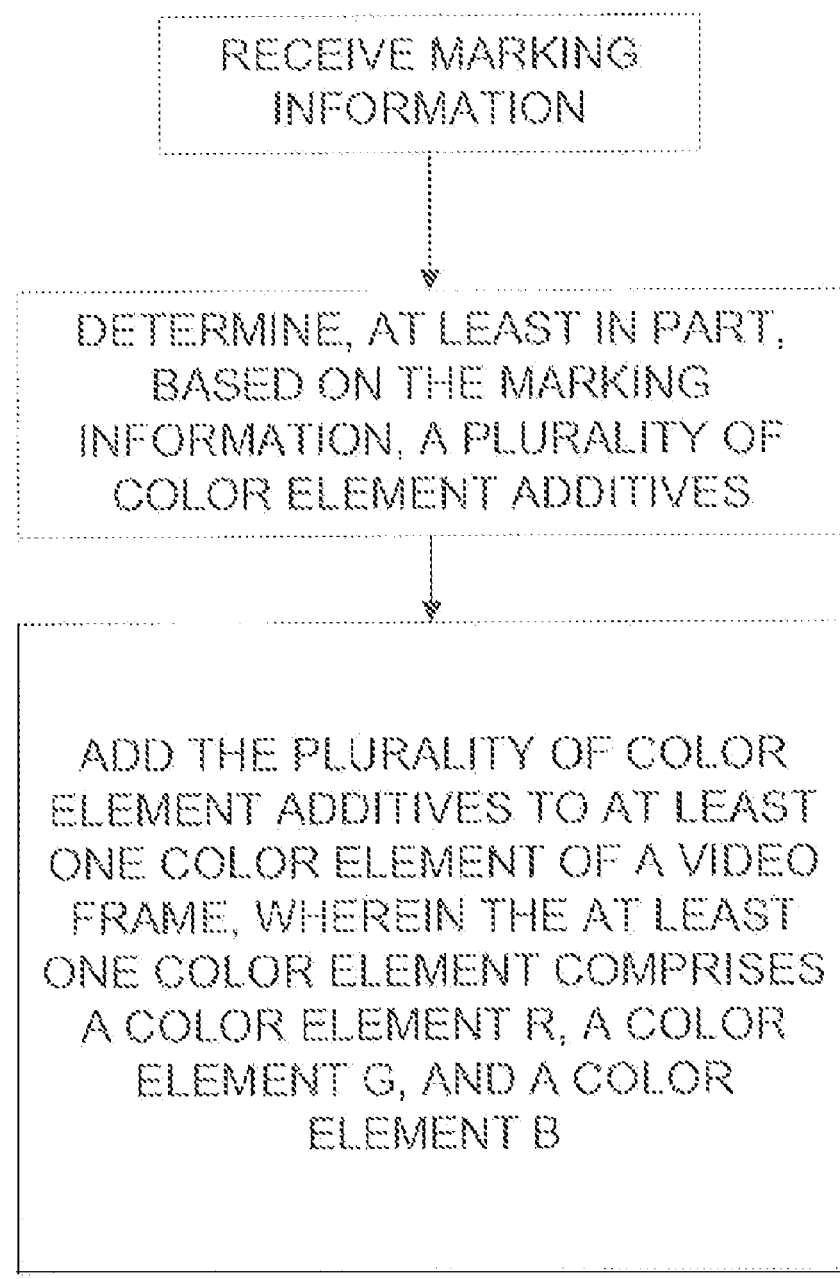
FIGS. 7-9B are simplified flowcharts of preferred methods of operation of the system of FIG. 1.
Figure 8:
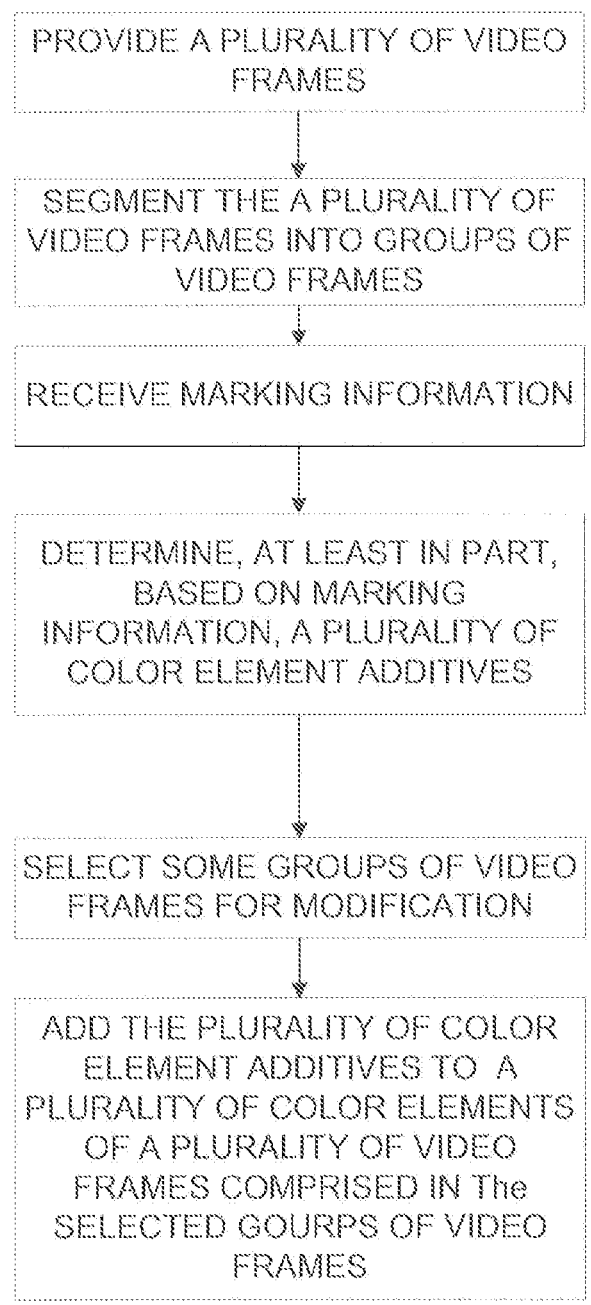
Figure 9A:
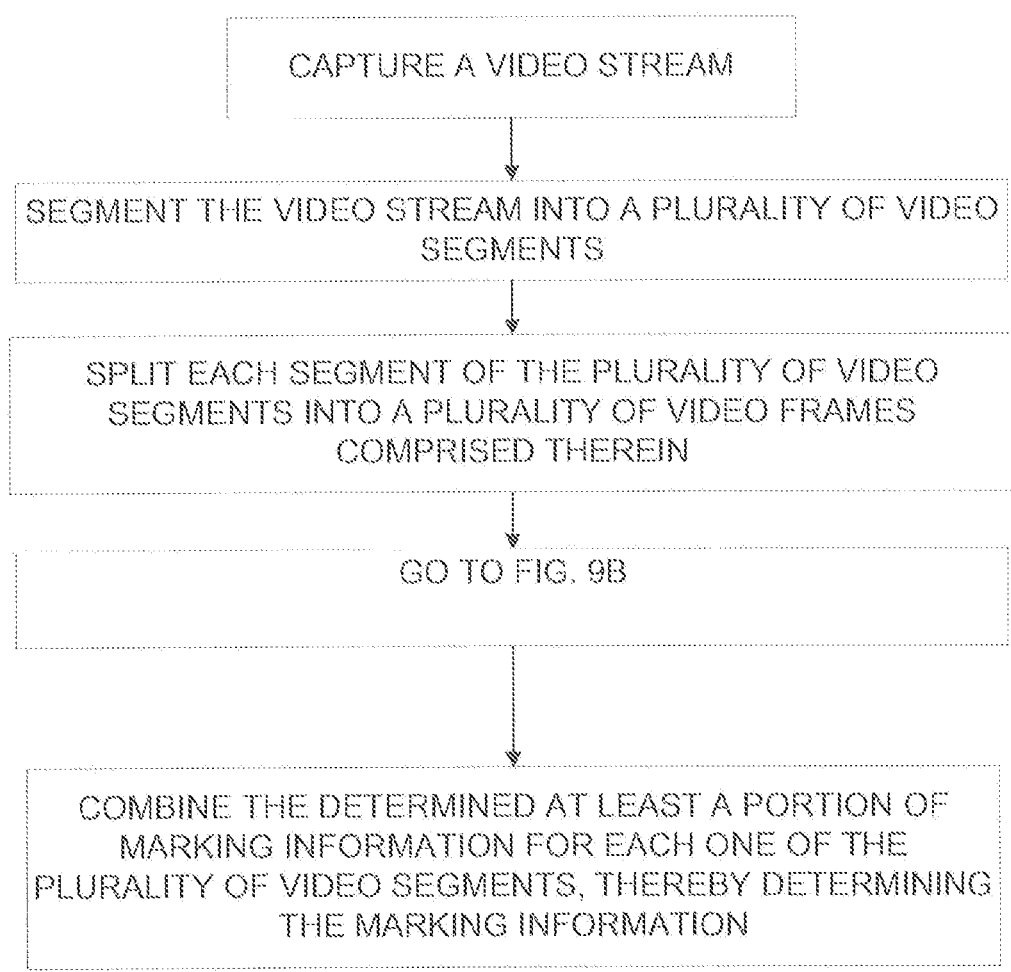

Reference is now made to FIG. 6, which is a simplified illustration depicting use of a Fourier transform in the embedded data detection portion of the video data embedding system of FIG. 1. For the purposes of the discussion of FIG. 6, it is appreciated that the abscissa of the graph on the left side of FIG. 6 comprises 't' (frame number), and the ordinate of the graph on the left side of FIG. 6 comprises R(t) (the sum of R component over frame t). Likewise, the abscissa of the graph on the right side of FIG. 6 comprises ω (frequency), and the ordinate of the graph on the left side of FIG. 6 comprises A(ω) (amplitude/intensity of frequency ω). A frequency injected by the data embedding system 20 (FIG. 1) into one of the color components, appears as a peak on the frequency chart, on the right of FIG. 6, and is, accordingly, preferably discernable to either a human operator or to a computerized program. In one preferred embodiment of the present invention, the WM detection portion of the video data embedding system of FIG. 1 preferably analyzes the ratio of the intensity of the most prominent frequency detected to the intensity of the second most prominent frequency detected in order to decide if the most prominent frequency detected does comprise a dominant frequency, thereby indicating successful detection.

The detection device 90 (FIG. 1) preferably extracts and determines dominant frequencies from consecutive video segments. In preferred embodiments where only one position bit is utilized, as explained above, frequencies encoding the first extended byte $E_0$ are preferably identified by the start bit $s_0$. Once the first extended byte $E_0$ is determined, each subsequent byte can be determined by translating frequencies back. Accordingly, marking information 15 can be determined in its entirety.

It is appreciated that in embodiments where more positional bits are used, a relative position of a byte $E_i$ in a sequence of marking information bytes $E_0 \ldots E_n$ can preferably be determined by the value of the positional bits. In embodiments that do not use positional bits, the sequence of marking information bytes can preferably be determined by other means, including:

correlating the values of the extended bytes, for example, the last byte comprising a checksum of the first bytes;
using special frequencies for one of the extended bytes, for example, using a frequency in the first byte that is lower than the minimum frequency used in any other byte; and
using other signals, such as marking the last byte by a period of "silence" (no injection of any frequencies) following that byte.

It is the opinion of the inventors of the present invention that the color mass frequency data embedding technique described herein is highly resistant to known attacks. Specifically:

Filtering—the proposed WM technique cannot be detected or removed using standard low-pass filters, video color balance tools, etc, since the frequencies used by the invention preferably comprise frequencies which are below the range normally considered to be noise;

Resizing (stretching), rotation, and cropping—since the whole screen carries the WM information uniformly, no known attack using geometric transformation can damage the WM; and Collusion attacks—collusion attacks typically work by averaging several video signals comprising WMs, or choosing each frame out of several frames comprising WMs, thereby resulting in a WM that combines data from all originally examined signals. In particular, a frequency analysis of the combined signal typically reveals all injected frequencies. If the data embedding system 20 (FIG. 1) waits between injections of separate bytes, as is described above, then the resulting signal preferably contains intervals when only one of the original WMs is present, thereby allowing signal separation. Standard error-correction techniques, well known in the art, used both at injection and at detection, preferably are utilized in order to assist in separating the WMs.

Reference is now made to FIGS. 7-9B, which are simplified flowcharts of preferred methods of operation of the system of FIG. 1. FIGS. 7-9B are believed to be self-explanatory in light of the above discussion.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method implemented on a content rendering device, the method comprising:
at a marking information receiver, receiving a unique device identifier comprising information identifying the content rendering device, the information identifying the content rendering device comprising marking information;
at a determiner, determining a plurality of color element additives for a video frame, the determining comprising, at least in part, deriving harmonic functions based on the marking information, wherein the determining the plurality of color element additives comprises, at least in part:
determining:

$$R(t) = A * \sin\left(\frac{2\pi(f_R + a)}{\tau}(t + \phi_R)\right)$$

$$G(t) = A * \sin\left(\frac{2\pi(f_G + a)}{\tau}(t + \phi_G)\right)$$

$$B(t) = A * \sin\left(\frac{2\pi(f_B + a)}{\tau}(t + \phi_B)\right),$$

wherein:
- variable A denotes a wave amplitude,
- variable t denotes the video frame,
- variable $f_R$, variable $f_G$, and variable $f_B$ are each one of a plurality of values determined based, at least in part, on the marking information,
- variable $\tau$ denotes a base wavelength,
- variable $\phi$ denotes a wave phase,
- constant a denotes a base frequency; and
- each of R(t), G(t), and B(t) denotes one of the plurality of color element additives;

at a color element adder, adding at least one of the plurality of color element additives to at least one color element of the video frame to apply a watermark to the video frame, wherein the at least one color element comprises a color element R, a color element G, and a color element B.

2. The method according to claim 1 and wherein the marking information comprises one of:
- a copyright mark; and
- access rights data.

3. The method according to claim 2 and wherein the access rights data comprise playback/copying permission.

4. The method according to claim 1 and wherein the at least one color element comprises a Red-Green-Blue color element.

5. The method according to claim 1 and wherein the at least one color element comprises a chrominance/luminance color element.

6. The method according to claim 5 and wherein the chrominance/luminance color element comprises one of:
- a YCbCr chrominance/luminance color element;
- a YPbPr chrominance/luminance color element;
- a YDbDr chrominance/luminance color element; and
- a xvYCC chrominance/luminance color element.

7. The method according to claim 1 and wherein R(t), G(t), and B(t) are each rounded to an integer value.

8. The method according to claim 1 and wherein each of the values denoted by the variable $f_R$, the variable $f_G$, and the variable $f_B$ comprises a binary value.

9. The method according to claim 1 and wherein A comprises at least one of:
- a value sufficiently low as to not substantially cause a change in color intensity;
- a value sufficiently high as to be substantially distinct upon detection, such that A comprises a value noticeable above detected background noise;
- a value in a range of 1-4% of total amplitude; and
- $1 \leq A \leq 10$.

10. The method according to claim 1 and wherein $180 \leq \tau \leq 3000$.

11. The method according to claim 1 and wherein at least one of:
- $\phi$ is randomly selected; and
- $\phi$ is randomly selected each time a new byte of marking information is utilized as input to determine a value of the variable $f_R$, a value of the variable $f_G$, and a value of the variable $f_B$.

12. The method according to claim 1 and wherein a comprises a value such that: $0 \leq a \leq 80$.

13. The method according to claim 1 and further comprising modifying a value of R(t), G(t), and B(t) by a fractional multiplier before the adding.

14. The method according to claim 13 and wherein the fractional multiplier is incrementally increased until the fractional multiplier is equal to one (1).

15. The method according to claim 1 and wherein the variable R(t), the variable G(t), and the variable B(t) are applied to the color element R, the color element G, and the color element B, respectively, and the applying of variable R(t), the variable G(t), and the variable B(t) to the color element R, the color element G, and the color element B, respectively, comprises applying to every pixel comprised in a video screen.

16. The method according to claim 1 and wherein the variable R(t), the variable G(t), and the variable B(t) are applied to a color element R, a color element G, and a color element B, respectively, such that at least one of:
- the color element R, the color element G, and the color element B do not exceed a maximum value allowed for each said color element in a color representation system; and
- the color element R, the color element G, and the color element B do not fall below a minimum value allowed for each said color element in the color representation system.

17. The method according to claim 16 and wherein the color representation system comprises one of:
- a Red-Green-Blue color element; and
- a chrominance/luminance color element.

18. A system comprising:
- a marking information receiver;
- a determiner, which determines a plurality of color element additives for a video frame by at least in part, deriving harmonic functions based on the marking information, and determining:

$$R(t) = A * \sin\left(\frac{2\pi(f_R + a)}{\tau}(t + \phi_R)\right)$$

$$G(t) = A * \sin\left(\frac{2\pi(f_G + a)}{\tau}(t + \phi_G)\right)$$

$$B(t) = A * \sin\left(\frac{2\pi(f_B + a)}{\tau}(t + \phi_B)\right),$$

wherein:
- variable A denotes a wave amplitude,
- variable t denotes the video frame,
- variable $f_R$, variable $f_G$, and variable $f_B$ are each one of a plurality of values determined based, at least in part, on the marking information,
- variable $\tau$ denotes a base wavelength,
- variable $\phi$ denotes a wave phase,
- constant a denotes a base frequency; and
- each of R(t), G(t), and B(t) denotes one of the plurality of color element additives;
- a color element adder, which adds at least one of the plurality of color element additives to at least one color element of a video frame to apply a watermark to the video frame, wherein the at least one color element comprises a color element R, a color element G, and a color element B.

* * * * *

UNITED STATES PATENT AND TRADEMARK OFFICE
CERTIFICATE OF CORRECTION

PATENT NO. : 9,639,910 B2
APPLICATION NO. : 14/605123
DATED : May 2, 2017
INVENTOR(S) : Zeev Geyzel et al.

It is certified that error appears in the above-identified patent and that said Letters Patent is hereby corrected as shown below:

In the Specification

Column 8, Line 62, "a variable co," to read as --a variable $\omega$,--.

Column 8, Line 62, "the variable co," to read as --the variable $\omega$,--.

Column 9, Line 21, " $C(\omega) = \sum_{i=0}^{L-1} C'(i) \cdot \cos(\omega i)$ " to read as -- $C(\omega) = \sum_{i=0}^{L-1} C'(i) * \cos(\omega i)$ , and--.

Column 9, Line 24, " $S(\omega) = \sum_{i=0}^{L-1} C'(i) \cdot \sin(\omega i)$, and " to read as -- $S(\omega) = \sum_{i=0}^{L-1} C'(i) * \sin(\omega i)$ --.

Column 14, Line 47, "random (is" to read as --random $\varphi$--.

Column 14, Line 59, "by ti," to read as --by $\tau$,--.

Column 15, Line 3, "f= 101" to read as --$f_R = 101$--.

Column 16, Lines 7-8, "phase p" to read as --phase $\varphi$--.

Signed and Sealed this
First Day of August, 2017

*Joseph Matal*
*Performing the Functions and Duties of the*
*Under Secretary of Commerce for Intellectual Property and*
*Director of the United States Patent and Trademark Office*